E. L. CLARK.
CRUSHER ROLLER FOR COAL BREAKERS, &c.
APPLICATION FILED AUG. 5, 1912.
1,058,948.
Patented Apr. 15, 1913.
2 SHEETS—SHEET 1.
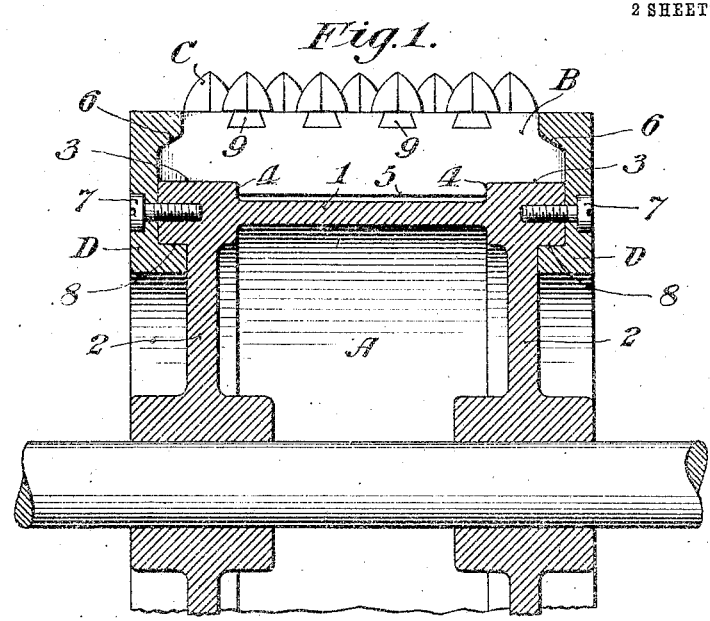
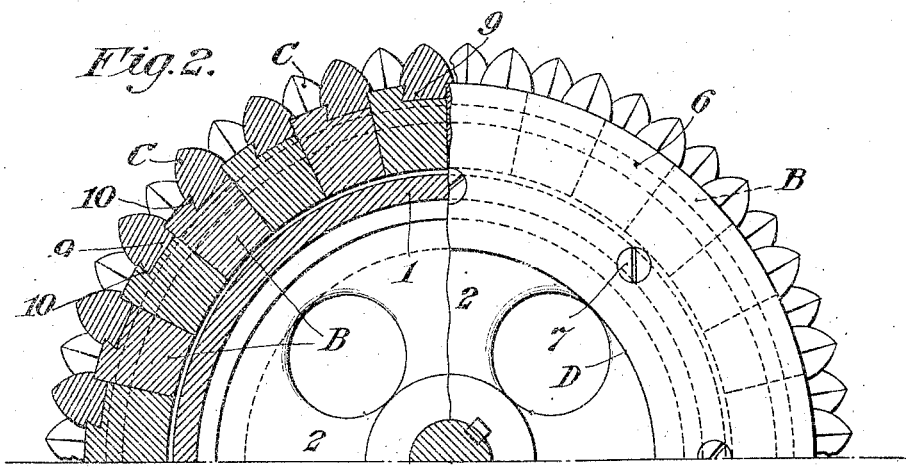
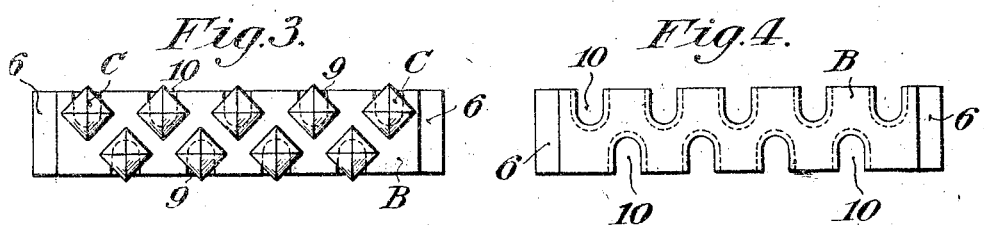
WITNESSES:
Frances Griffin
Alexander Snead
INVENTOR
Edward L. Clark,
BY John R. Nolan
ATTORNEY.

E. L. CLARK.
CRUSHER ROLLER FOR COAL BREAKERS, &c.
APPLICATION FILED AUG. 5, 1912.
1,058,948.
Patented Apr. 15, 1913.
2 SHEETS—SHEET 2.
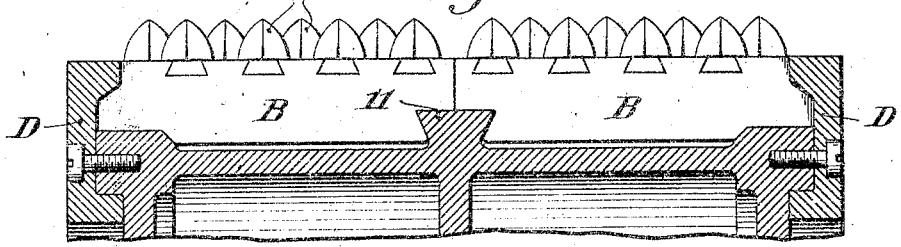
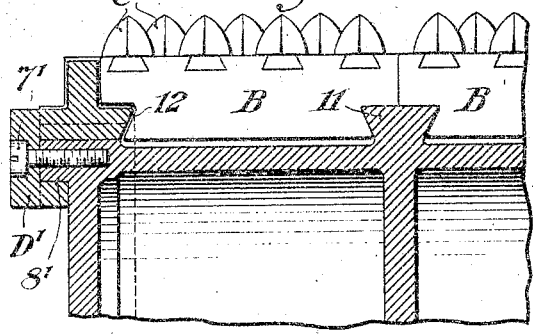
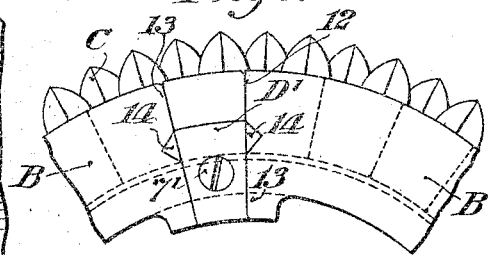
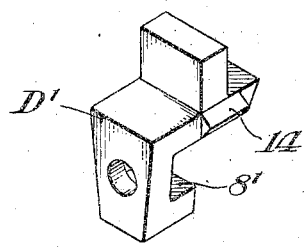
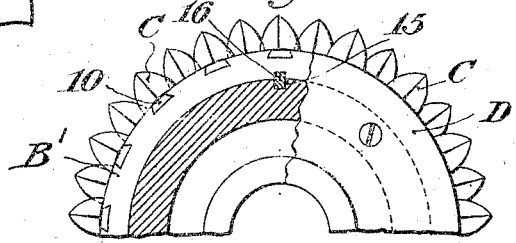
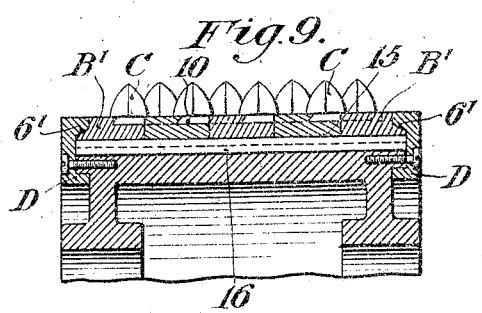
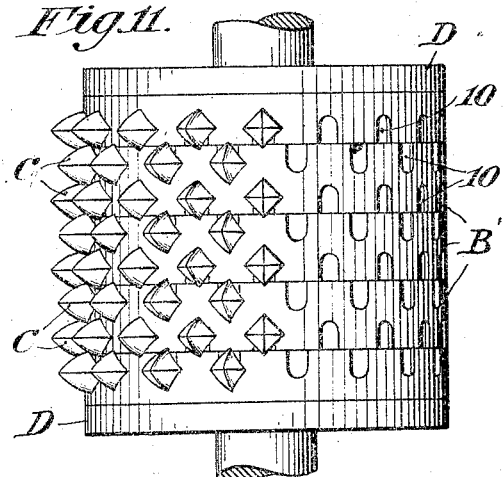
WITNESSES
Frances Griffin
Alexander Snead
INVENTOR
Edward L. Clark
BY John F. Nolan
ATTORNEY.

UNITED STATES PATENT OFFICE.

EDWARD L. CLARK, OF SCRANTON, PENNSYLVANIA.

CRUSHER-ROLLER FOR COAL-BREAKERS, &c.

1,058,948.

Specification of Letters Patent. Patented Apr. 15, 1913.

Application filed August 5, 1912. Serial No. 713,210.

*To all whom it may concern:*

Be it known that I, EDWARD L. CLARK, a citizen of the United States, and resident of Scranton, in the county of Lackawanna and State of Pennsylvania, have invented certain new and useful Improvements in Crusher-Rollers for Coal-Breakers, &c., of which the following is a specification.

This invention relates to crusher rollers for coal breaking and analogous apparatus; its object being to provide a simple, efficient and durable construction whereby the circumferential breaker teeth may be readily assembled on and attached to the body of the roller, and whereby said teeth, or any of them, may be as readily removed and replaced for repair, renewal, or other requirements of service.

My invention, as generally stated, comprises a roller body having thereon a circumferential series of tooth-bearing members, and means for detachably locking the same together and to said body.

My invention also comprises means whereby the individual teeth are detachably mounted on the said members.

My invention also comprises various novel features of construction whereby practical advantages are secured, as will be hereinafter fully described and claimed.

In the annexed drawings—Figure 1 is a longitudinal vertical section of a portion of a crusher roller embodying a good form of my invention. Fig. 2 is a sectional end elevation thereof. Fig. 3 is a plan of one of the circumferential members as provided with detachable breaker teeth. Fig. 4 is a similar view of said member with the teeth removed. Figs. 5 and 6 are longitudinal vertical sections of modified forms of the invention, wherein plural rows of toothed segmental members are employed. Fig. 7 is a partial end view of Fig. 6, showing the closing block. Fig. 8 is a perspective view of said block. Fig. 9 is a longitudinal vertical section of a modification wherein the tooth-bearing sections are in the form of rings encircling the body of the rollers. Fig. 10 is a sectional end elevation of Fig. 9. Fig. 11 is a partial plan, several of the teeth being omitted to expose the recesses in the rings.

Referring to Figs. 1 to 4, inclusive, A represents the body of a crusher roller comprising the rim 1 and its supporting end heads or spiders 2, the outer face of the rim having therein a circumferential groove which provides annular end flanges 3 with inner shoulders 4. A series of segments B, constructed to encircle the rim, are equipped with peripheral breaker teeth C, said segments and teeth being severally attachable to and detachable from each other and to and from the rim, as will be presently explained.

Each of the segments, in its preferred form, comprises a metal bar of cast steel, which extends from end to end of the roller, and is seated upon the annular end flanges 3 of the latter. The bottom of the bar is provided longitudinally thereof with a tongue or rib 5 which snugly enters the circumferential groove of the rim and takes against the end shoulders 4; such shoulders thus counteracting the end thrust upon and preventing endwise displacement of the segment. The peripheral end corners of the segment are offset to provide bevel-faced tongues 6.

Two face-grooved rings D are detachably secured, as by screws or bolts 7, to the ends of the roller in position to receive and embrace the opposing outer edges of the rim and the beveled ends of the segmental bars, and thus snugly clamp the entire series of segments as a unit upon the rim of the roller; the wall 8 of each ring, by its abutment against the flanged rim of the roller, taking the jar and strain from the screws or bolts on the up-thrust during the operation of the roller.

Each of the teeth C preferably comprises a pyramidal body having a base or root 9 of undercut or dove-tail form which is adapted to be removably fitted to a corresponding recess 10 in the periphery of a segment. Each segment is provided at its respective lateral edges with a series of these recesses, those on one side preferably alternating with those on the other, as indicated most clearly in Fig. 4, whereby two rows of teeth, in staggered relation to each other, may be employed, as best illustrated in Fig. 3. The base or root of each tooth completely fills the recess to which it is applied and lies flush with the outer edge of the segment, so that when the respective segments thus equipped with the two rows of teeth are assembled side by side the contiguous edges of the successive segments effectually lock the teeth in place and obviate any liability of their displacement. (See Fig. 2.)

By the construction above described it will be seen that the individual teeth may be readily inserted in the recesses of the segments and therein securely held by the dovetail connections; that the toothed segments can be successively applied to the grooved surface of the roller until the latter is completely studded with teeth throughout its circumference; and that the entire series of toothed segments can then be quickly and reliably clamped in place by applying the grooved rings D to the respective ends of the roller and segments. It will also be seen that in the event of a tooth or teeth upon the roller being broken while in service, the segment or segments containing the particular defective tooth or teeth can be readily detached from the roller; such tooth or teeth can be removed; a new tooth or teeth can be substituted therefor, and the segment or segments can then be replaced and locked on the roller.

In Fig. 5, I have shown a slight modification of my invention wherein two rows of segments are indicated as arranged in endwise alinement with each other, the inner or abutting ends of the segments of the respective rows being oppositely recessed to provide a dove-tail groove for the reception of a circumferential dove-tail tongue 11 on the roller, which connection thus serves, in conjunction with the outer end clamp-rings D, to lock the segments securely, though detachably, to the roller.

In Figs. 6, 7 and 8 I have illustrated another modification of the plural row form just described. In this construction the clamp-rings D are omitted; the outer end walls of the circumferential grooves of the roller are undercut to provide inclined or dove-tail tongues, as at 12, and the outer ends of the segments are correspondingly recessed to interlock with such tongues and thus secure the segments against radial and endwise displacement on the roller.

In order to permit the ready application of the segments to the roller, the outer end walls of the circumferential grooves are each cut out at a suitable point on the end of the roller. The studded segments of each row are individually applied to the roller by way of the opening 12 thus provided, and such segments are successively moved around the circumference of the roller and into engagement at their respective ends with the annular dove-tail members of the roller, until the latter is fully encircled by the segments. Thereupon a filler block, as D', is applied to the opening 12 and secured to the roller by means of a screw, as 7', so as to retain the circular series of segments in interlocking engagement with the roller. This block in the form illustrated is provided with a shouldered portion 8' which enters a recess 13 in the flanged rim of the roller, and also with lateral tongues 14 which fit corresponding grooves in the walls of the opening, thus effectually relieving the screw 7' from radial thrust during the operation of the roller.

In Figs. 9, 10 and 11 I have shown still another modification wherein the tooth-bearing sections or members comprise a series of rings B' assembled side by side on the circumference of the roller, the outermost rings of the series being beveled, as at 6', to receive the corresponding beveled walls of the clamp rings D which detachably lock the entire series of rings in place. To prevent these rings from turning relatively to the body of the roller, they are provided on their inner faces with transverse key-ways 15 which are arranged in alinement with and receive a key or feather 16 suitably disposed on said body. The peripheral rings B' are provided at their lateral edges with the dove-tail recesses 10 for the reception and retention of the basal ends of the teeth C, the latter, as in the previously described constructions, being positively held in place by the opposing edges of the respective rings.

It is to be understood that my invention is not limited to the specific details of construction herein shown and described, as the structure may be modified in various particulars without departure from my invention; for example, in one aspect of my invention, the breaker teeth may be permanently secured to or be integral with the detachable segmental or ring members.

I claim—

1. A crusher roller comprising a body having a circumferential groove, segments provided with ribs in registry with said groove, teeth on said segments, and means for detachably securing said segments to the body.

2. A crusher roller comprising a body having a circumferential groove, segments provided on their under sides with ribs in registry with said groove, and provided also with beveled end portions, teeth on said segments, grooved rings embracing the said body and beveled end portions, and means for detachably securing said rings to the ends of said body.

3. A crusher roller comprising a body, peripheral members thereon having in their respective sides alternating recesses, teeth provided with basal portions removably fitted to said recesses, and means for detachably securing said members to the body.

4. A crusher roller comprising a body, peripheral members thereon arranged in close relation to each other, each of said members having a series of open-mouthed laterally-disposed recesses, teeth provided with basal portions removably fitted to said recesses and flushed with the recessed side of the members, whereby the teeth of each member are locked in place by the contiguous side of the adjacent member, and means for detachably securing said members to the body.

5. A crusher roller comprising a body, peripheral segments thereon arranged in close relation to each other, having each beveled end portions and a series of open-mouthed laterally-disposed recesses, teeth provided with basal portions removably fitted to said recesses and flushed with the recessed side of the segments, whereby the teeth of each segment are locked in place by the contiguous side of the adjacent segment, grooved rings embracing the body and beveled end portions of the segment to prevent displacement of the assembled segments, and means for detachably securing said rings to the ends of said body.

Signed at Scranton, in the county of Lackawanna, and State of Pennsylvania this 29th day of July A. D. 1912.

EDWARD L. CLARK.

Witnesses:
JENNIE WARD,
W. S. HILL.